United States Patent Office 3,263,208
Patented July 26, 1966

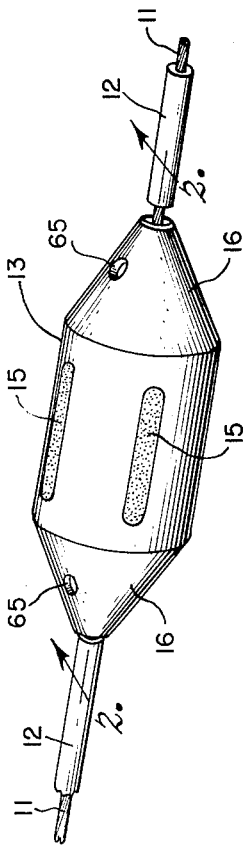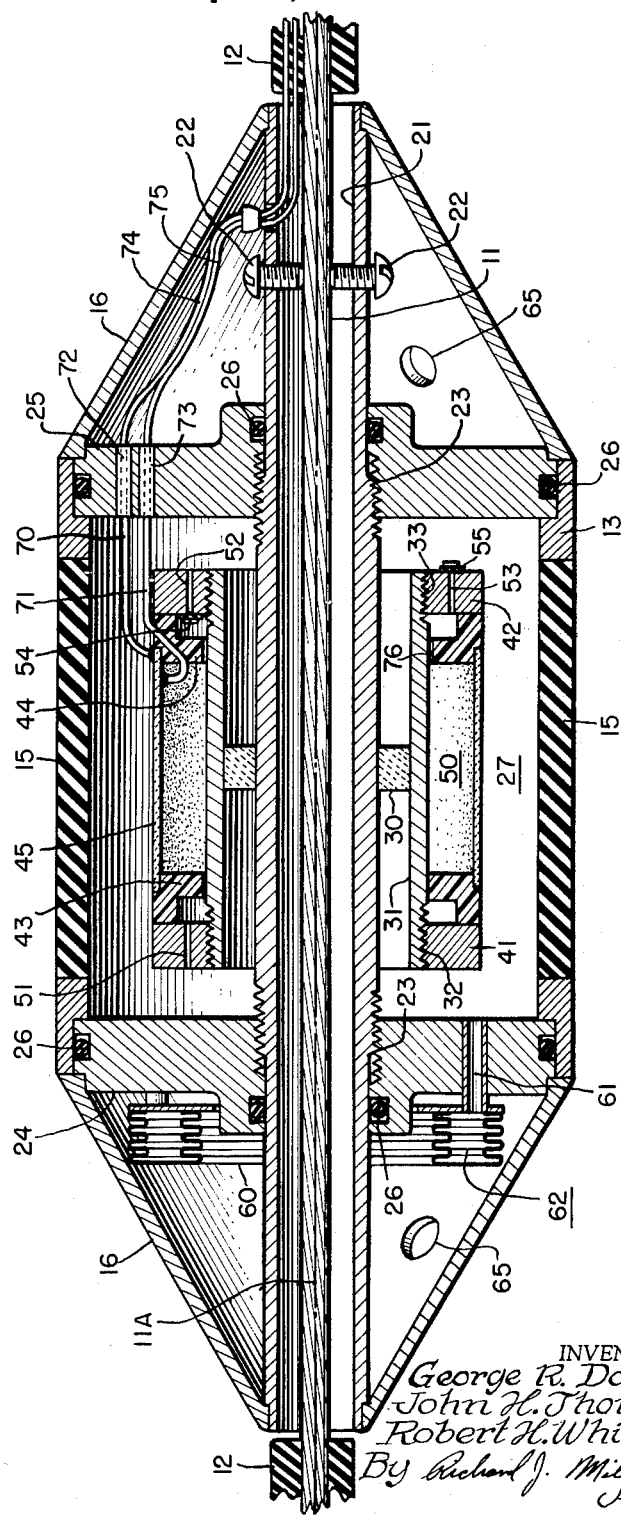

3,263,208
PRESSURE COMPENSATED TRANSDUCER
George R. Douglas and John H. Thompson, Pittsburgh, and Robert H. Whittaker, Export, Pa., assignors, by mesne assignments, to the United States of America as represented by the Secretary of the Navy
Filed Sept. 12, 1963, Ser. No. 308,600
5 Claims. (Cl. 340—8)

This invention relates to an inertia balanced hydrophone and more specifically to an electroacoustic transducer that responds to water-borne sound waves and delivers essentially equivalent electric waves.

In certain applications wherein sound waves are to be detected by a ship it is advantageous to have a plurality of hydrophones spaced from each other and immersed in the sea water at the same time. In the past it has been necessary to utilize a plurality of cables and a plurality of hydrophones individually affixed to each cable to accomplish the mission.

Additionally, wherein hydrophones are to be immersed at varying depth, distortions are introduced into the ceramic elements due to the variations of sea pressure which causes unwanted signals.

It is therefore an object of this invention to provide an improved inertia balanced hydrophone.

It is a further object of this invention to provide a hydrophone which may be mounted upon a cable and affixed thereto at any predetermined point.

It is a further object of this invention to provide an improved hydrophone, several of which may be mounted upon a single cable at spaced points thus providing a receiving array for detecting sound waves.

It is still a further object of this invention to provide an inertia balanced hydrophone comprising: a housing, having a plurality of acoustical windows, defining a first closed volume; a crystal element, defining with its supporting structure a second closed volume, mounted within said first closed volume, for generating an electrical signal in response to receipt of a sound wave; a pressure sensitive deformable member defining a third closed volume adjacent said housing, said first, second and third volumes filled with a substantially noncompressible fluid; and, means connecting said first and third volumes and said first and second volumes for allowing passage of fluid therebetween in response to changes in pressure on said deformable member.

Further advantages and objects of this invention will be apparent from the accompanying specifications and drawings wherein:

FIG. 1 is a perspective view of a hydrophone incorporating the invention, and FIG. 2 is a cross sectional view along line 2—2 in FIG. 1.

The hydrophone in FIG. 1 is mounted on a cable 11 having a coating or insulation 12, a portion which is removed leaving bare cable and having a longitudinal axis 11a. The hydrophone includes a housing 13 having acoustical windows 14 and 15 filled with rubber or any suitable material which will transmit pressure variations of the water to the inner portion of the hydrophone. A pair of end cap members 16 serve to protect the inner portion of the hydrophone.

FIG. 2 shows in cross sectional view a detailed construction of an inertial hydrophone incorporating the invention. A cable attachment or tubular member 21 having a diameter sufficiently large to slip over the insulated portion of cable 11 is affixed to the cable by a plurality of set screws 22, two of which are shown. It is to be understood that sufficient set screws are provided to properly position the hydrophone about the cable so that an acoustical balance may be established. Threaded portions 23 are provided on tubular member 21 for adjustably holding a pair of end plates 24, 25 thereon. The outer housing 13 is properly positioned on the tubular member 21 and firmly held thereto by proper adjustment of plates 24 and 25. Four O rings 26 are provided to seal the outer housing and the end plates to the tubular plate 21 so that a first closed volume 27 is provided.

A ceramic support web 30 positions a ceramic tube 31 substantially centrally within the first closed volume 27 and the threaded portions 32, 33 are provided for mounting a pair of end plates 41, 42 on the support tube 31. A pair of annular plastic rings 43, 44 provide a resilient mounting for a ceramic piezoelectric element 45. Element 45, plastic rings 43 and 44 and ceramic support tube 31 define a second closed volume 50. A plurality of capillary tubes 51, 52 and 53 are shown providing passages between the first and second closed volumes 27, 50. Capillary tube 52 has a "pop-off" valve 54 mounted as shown on the inner face of plate 42, and capillary tube 53 has a similar "pop-off" valve 55 on the outer face of plate 42.

A hydrophone fairing or bellows type structure 60, including a third closed volume 62, is mounted adjacent to plate 24 and has a capillary tube 61 connecting its closed volume 62 with closed volume 27. An opening 65 in plate 16 allows the water pressure at the depth at which the hydrophone is positioned to impinge upon the fairing 60.

Additionally, there are provided leads 70, 71 connecting the crystal element 45 to a pair of sealed elements 72, 73 which provides an electrical path to leads 74, 75 for conducting electrical signals to a remotely placed reproducer (not shown).

Closed volumes 27, 50 and 62 plus capillary tubes 51, 52, 53 and 61 are all filled with a backing fluid which in one successful embodiment of the invention has a compressibility of approximately 2½ times that of water. In addition, a passageway 76 is provided between closed volume 50 and the entrance of capillary tubes 52, 53 into volume 50.

In operation as the hydrophone is lowered to greater depths the hydrostatic pressure is communicated through aperture 65 to the fairing 60 which is compressed thus reducing the closed volume 62 and forcing fluid through capillary 61 into closed chamber 27. Pop-off 54 valve opens and the fluid from closed volume 27 is forced through capillary tube 52 into the closed volume 50. The pressure on both sides of ceramic element 45 is equalized and a pressure equilibrium exists thereacross. Upon receipt of an acoustical signal transmitted from the water through the rubber windows 15 the ceramic element 45 is distorted and an electrical signal generated which is coupled through the leads to the remotely located reproducer. As the hydrophone is raised "pop-off" valve 55 opens and the fluid in closed volume 50 is allowed to flow into volume 27 and the fairing 60 expands.

It should be noted that the longitudinal axis 11A of the cable 11, the axis of housing 13 and of the axis of ceramic element 45 are substantially coaxial or superimposed upon each other. Thus, the effects of the cable on reception of sound waves with respect to the hydrophone are minimized. In the event that the plurality of hydrophones were to be mounted on a single cable individual portions of the insulation 12 would be removed and a hydrophone affixed at each such point. Additional wires would be provided either within insulation 12 as shown or adjacent thereto to provide electrical paths to the individual transducers.

We claim:
1. An improved pressure compensated transducer positionable along a support cable having mounted therealong electrical signal transmission means, comprising:
   (a) a first hollow cylindrical member positioned about said cable;

(b) first and second sets of set screws to position said first member in acoustical balance about said support cable;
(c) first and second end members adjustable along said first cylindrical member;
(d) a second hollow cylindrical member supported by said end members and defining herewith a first closed volume;
(e) an annular support member positioned about said first cylindrical member midway between said first and second end members;
(f) a third hollow cylindrical member supported at its midway point by said annular member;
(g) third and fourth end members supported on said third cylindrical member;
(h) a fourth hollow cylindrical member capable of producing electrical signals upon receipt of acoustical signal supported by said third and fourth end members and defining therewith a second closed volume within said first closed volume;
(i) a hollow resilient member defining a third closed volume positioned outside of said first closed volume;
(j) a plurality of capillary tube means connecting said first and second volumes, and said first and third volumes;
(k) pressure transmissive liquid filling said first, second and third volumes;
(l) acoustical windows in said second cylindrical member capable of transmitting acoustical signals; and
(m) means, connecting said fourth cylindrical member to the electrical transmission means mounted on said support cable.

2. The transducer of claim 1 wherein the axes of said first, second, third and fourth cylindrical members are coaligned.

3. The transducer of claim 2 wherein said first, second, third and fourth end members are substantially perpendicular to said coaligned axes.

4. An inertia balanced hydrophone comprising:
(a) a tubular member having a longitudinal axis;
(b) a pair of end plates affixed to said tubular member;
(c) a housing having a plurality of acoustical windows therein affixed to said end plates defining with said pair of end plates and said tubular member a first closed volume;
(d) a support tube within said volume;
(e) a support web affixed to said tubular member and said support tube;
(f) a pair of support plates adjustably held by said support tube;
(g) a pair of resilient support members on said support tube positioned between said support plates;
(h) a cylindrical ceramic element coaxially adjacent with said longitudinal axis, supported by said resilient support member, defining a second closed volume with said support tube;
(i) a pressure sensitive annular member adjacent one of said end plates and connected to said first closed volume by a capillary tube;
(j) a substantially noncompressible fluid filling said annular member, first and second closed volumes.

5. An inertia balanced hydrophone for mounting on an undersea cable, comprising:
(a) a tubular member having a longitudinal axis;
(b) means for adjustably mounting said member on a cable;
(c) a pair of end plates mounted on said tubular member;
(d) a housing, having a plurality of acoustical windows therein held by said end plates and defining with said pair of end plates and said tubular member a first closed volume;
(e) a support tube within said first volume;
(f) a support web mounting said support tube to said tubular member;
(g) a pair of support plates adjustably held by said support tube;
(h) a pair of resilient support members on said support tube positioned between said support plates;
(i) a cylindrical ceramic element coaxially aligned with said longitudinal axis, supported by said resilient support members, defining a second closed volume with said support tube;
(j) a pressure sensitive annular member adjacent one of said end plates and connected to said first closed volume by a capillary tube;
(k) a substantially noncompressible fluid filling said annular member, first and second closed volumes.

References Cited by the Examiner
UNITED STATES PATENTS

| | | | |
|---|---|---|---|
| 2,581,091 | 10/1950 | Foster | 340—13 |
| 2,762,032 | 9/1956 | Vogel | 340—10 |
| 2,837,731 | 6/1958 | Harris | 340—17 |
| 2,977,572 | 3/1961 | Pope | 340—10 |
| 2,978,672 | 4/1961 | Barney | 340—14 |
| 3,002,179 | 9/1961 | Kuester | 340—10 |
| 3,018,466 | 1/1962 | Harris | 340—8 |
| 3,199,071 | 9/1962 | Massa | 340—10 |

CHESTER L. JUSTUS, *Primary Examiner.*

G. M. FISHER, *Assistant Examiner.*